United States Patent [19]

Cole et al.

[11] Patent Number: 4,567,998

[45] Date of Patent: Feb. 4, 1986

[54] CHEMICAL DISPENSER FOR HAY BALER

[75] Inventors: Elmer Cole, Sayre; Ben Davis, Athens, both of Pa.

[73] Assignee: International Stock Food Company, Waverly, N.Y.

[21] Appl. No.: 576,086

[22] Filed: Feb. 1, 1984

[51] Int. Cl.[4] .............................................. B67D 5/22
[52] U.S. Cl. ...................... 222/44; 222/627; 222/231; 222/333; 222/367; 222/533; 56/341
[58] Field of Search .................. 99/485, 494; 406/139, 406/140, 41, 39; 222/231, 41, 44, 526, 47, 625, 559, 561, 316, 311, 310; 56/16.8, 16.4, 341; 239/565

[56] References Cited

U.S. PATENT DOCUMENTS

| | | | |
|---|---|---|---|
| 2,737,317 | 3/1956 | Gusitson | 222/310 X |
| 3,474,937 | 10/1969 | Frey | 222/231 X |
| 3,834,141 | 9/1974 | Bracht et al. | 56/341 |
| 3,880,359 | 4/1975 | Novy | 239/565 |
| 4,205,514 | 6/1980 | Wolrab | 56/341 |
| 4,228,638 | 10/1980 | Rabe et al. | 56/341 |
| 4,240,244 | 12/1980 | Martin | 56/16.4 |
| 4,352,267 | 10/1982 | Mellinger | 56/341 |

Primary Examiner—F. J. Bartuska
Assistant Examiner—David H. Bollinger
Attorney, Agent, or Firm—Sughrue, Mion, Zinn Macpeak & Seas

[57] ABSTRACT

A chemical dispenser is provided for hay balers and it comprises a hopper for the temporary storage of particulate chemicals. The hopper has a rounded bottom with a plurality of openings therein. The openings are selectively opened by ¼ increments by a slider. The slider has an indicator which cooperates with ¼ increment indicia printed on the front wall of the hopper for indicating the degree of opening thus permitting the operator to predetermine the quantity of particulate chemicals to be dispensed. For round hay balers, the dispenser has a blower and chemical directing lines.

17 Claims, 15 Drawing Figures

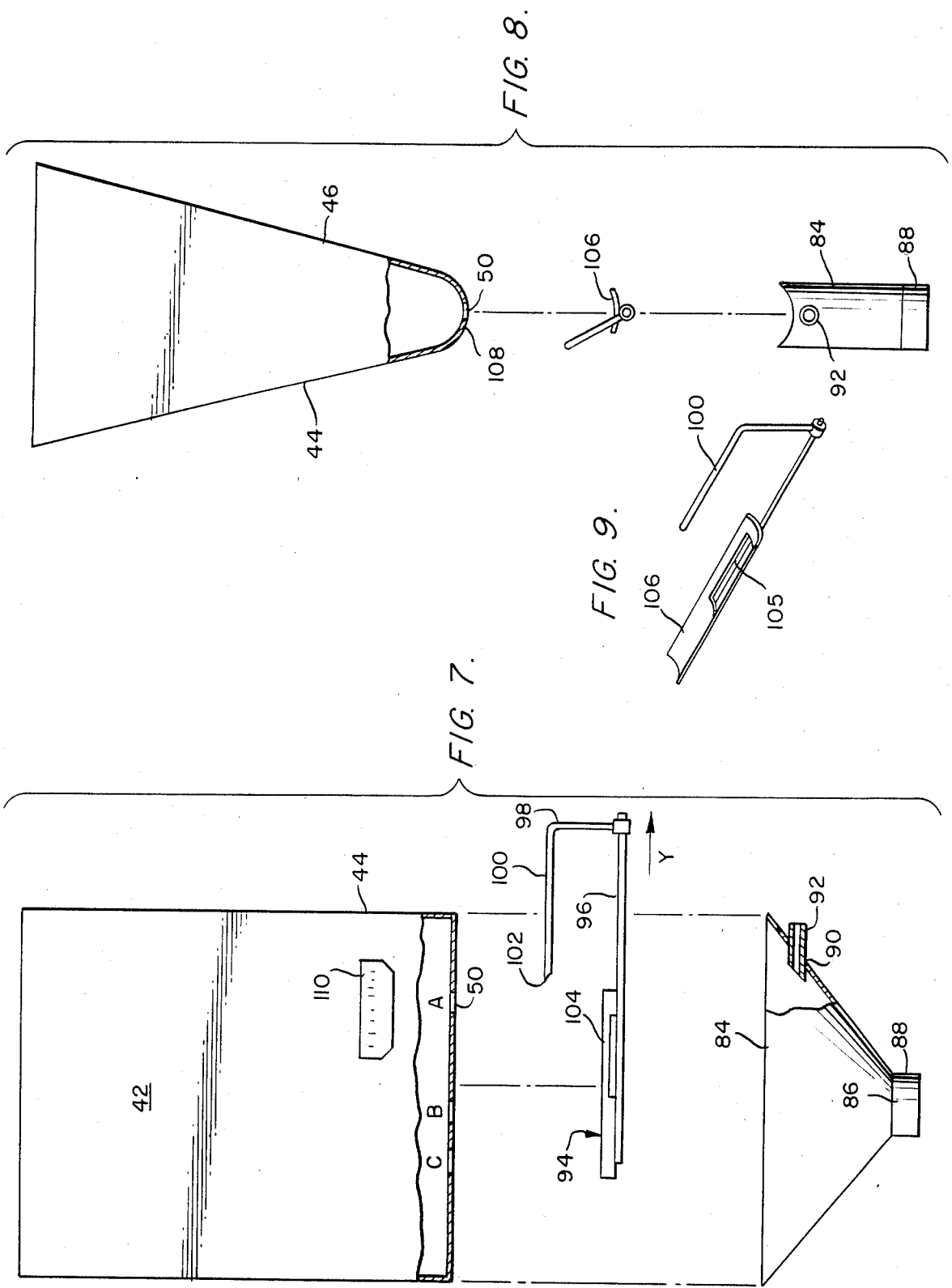

CHEMICAL DISPENSER FOR HAY BALER

BACKGROUND OF THE INVENTION

1. Field of the Invention

This invention is concerned with chemical dispensers for dispensing and directing flowable particulate chemical material onto hay or crop as it is being formed into a bale in a baling machine.

2. State of the Prior Art

The prior art discloses devices for dispensing particulate chemicals only hay or crop material as it is formed into round bales. These devices are not easily adaptable when it is required to change the rate of flow of chemicals to meet specific requirements such as the moisture content of the material being treated or the moisture absorption characteristics of the treating chemicals.

Representative of the prior art are listed below:

| Patentee | U.S. Pat. No. | Issue Date |
| --- | --- | --- |
| Frey | 3,474,937 | Oct. 28, 1969 |
| Bracht et al | 3,834,141 | Sept. 10, 1974 |
| Wolrab | 4,205,514 | June 3, 1980 |
| Martin | 4,240,244 | Dec. 23, 1980 |
| Rabe et al | 4,228,638 | Oct. 21, 1980 |
| Mellinger | 4,352,267 | Oct. 5, 1982 |

SUMMARY OF THE INVENTION

This invention pertains to a dry particulate chemical dispenser for use with a hay or crop baler which is inexpensive to produce and is easily adaptable to any variety of round or square hay balers.

Another object of this invention is to produce a dry particulate chemical dispenser for hay or crop balers which uniformly distributes a layer of chemicals across a swath of hay or crop before it is formed into a bale.

Another object of this invention is to provide a dry particulate chemical dispenser for hay or crop balers having metering means for varying the rate of discharge of chemicals onto a swath of hay or crop before it is formed into a bale.

And still another object of this invention it to provide a dry particulate chemical dispenser for a hay or crop baler which has visual indicating means for determining the rate of discharge of chemicals onto a swath of hay or crop before it is formed into a bale.

Another object of this invention is to provide a dry particulate chemical dispenser for a hay or crop baler which has a hopper for holding a quantity of chemicals to be dispensed and rotary means inside the hopper for facilitating discharge of chemicals onto hay or crop before it is formed into a bale.

Yet another object of this invention is to provide vibration means operating on the rotary means for preventing chemicals from hardening and clogging the dispenser metering means.

And yet another object of this invention is to provide a dry particulate chemical dispenser for a hay or crop baler having chemical conveying means with adjustable branches for varying the width of coverage of chemicals dispensed onto hay or crop before it is formed into a bale.

Still another object of this invention is to provide a dry particulate chemical dispenser for a hay or crop baler having means for producing an air stream for propelling dry particulate chemical materials through the conveying branches for the uniform distribution of a layer of chemicals onto a swath of hay or crop before it is formed into a bale.

These and other objects of this invention will become apparent from the reading of the following specification when taken in view of the annexed drawings.

BRIEF DESCRIPTION OF THE DRAWINGS

FIG. 7 is a front view of the hopper showing metering openings and a slide device for selectively opening or closing the openings and an inverted cone.

FIG. 8 is a side view of the hopper, slide devices and inverted cone.

FIG. 9 is a perspective view of the slide device.

DESCRIPTION OF THE PREFERRED EMBODIMENT OF THE INVENTION

Figure 1:
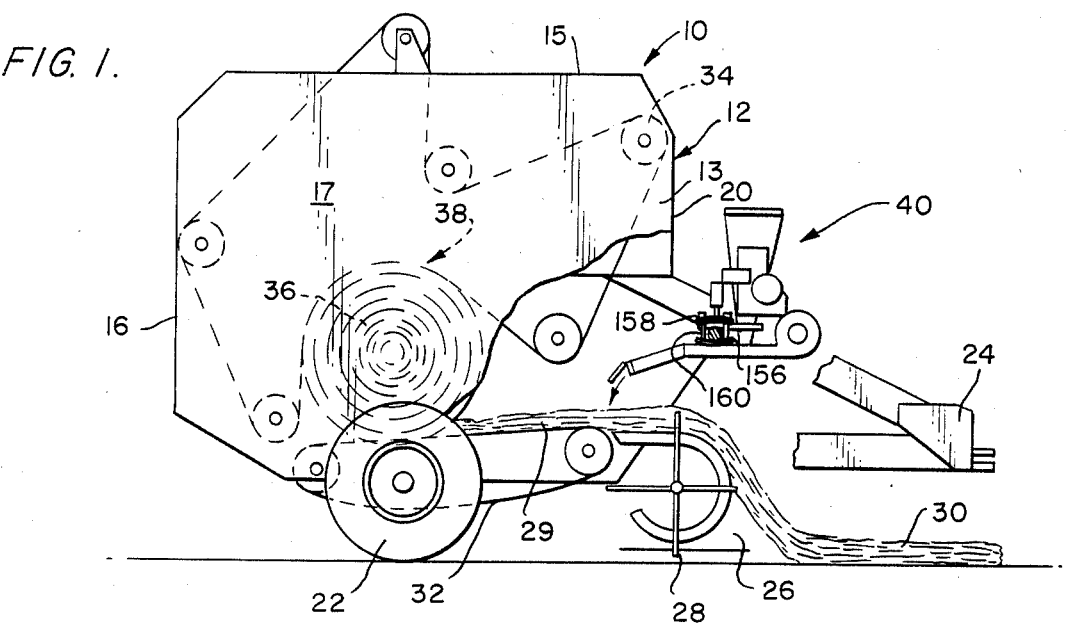
FIG. 1 is a cutaway side view of a hay baler showing the chemical dispenser attached thereto.

Referring now in more detail to the drawings, FIG. 1 shows a hay baler 10 having a housing 12 having side walls 13, and 14, a top 15 and a pivotable end wall 16 which define a hay forming chamber 17. There is an open front 20 for the reception of hay to be baled. The baler 10 has wheels 22 and a hitch 24 whereby the baler may be transported by a tractor. Extending laterally of the housing 12 and slightly forward of the open front 20 is a hay or crop lifter 26 having tines 28. The hay lifter 26 is rotated by conventional means such as the power takeoff of a tractor and it functions to deliver hay or crop material in the form of a continuous mat 30 onto the floor 29 of the baler chamber 17. The mat 30 is moved across the floor of the chamber 17 by suitable conveying means such as a plurality of rotatable laterally spaced angle-iron bearing chains 32. The chamber is provided with conventional means 34 for forming the mat 30 into a roll thus forming a round bale 36, the outline of which is shown at 38 in FIG. 1.

The baler 10 is provided with means to secure the completed roll of hay in any conventional manner.

Figure 2:
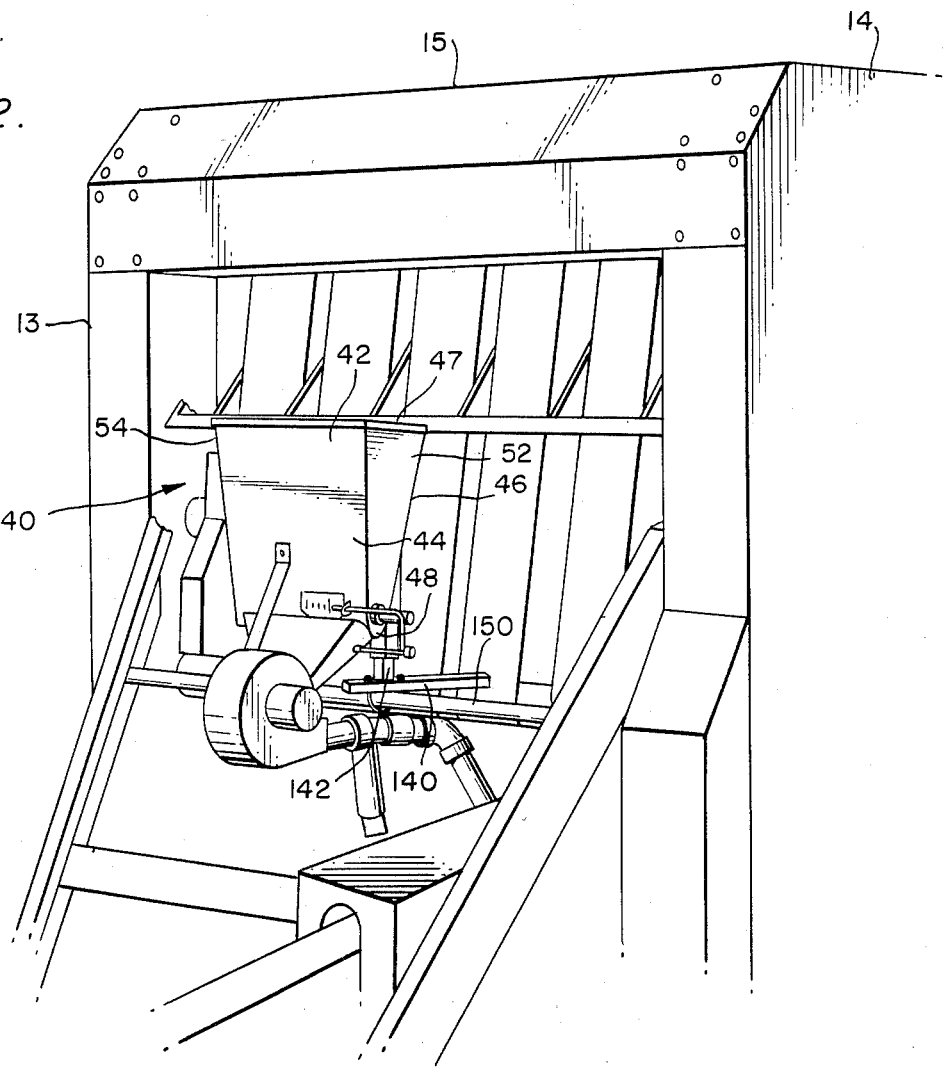
FIG. 2 is a rear view of a round hay baler showing the chemical dispenser attached to a cross beam on the hay baler.
Figure 3:
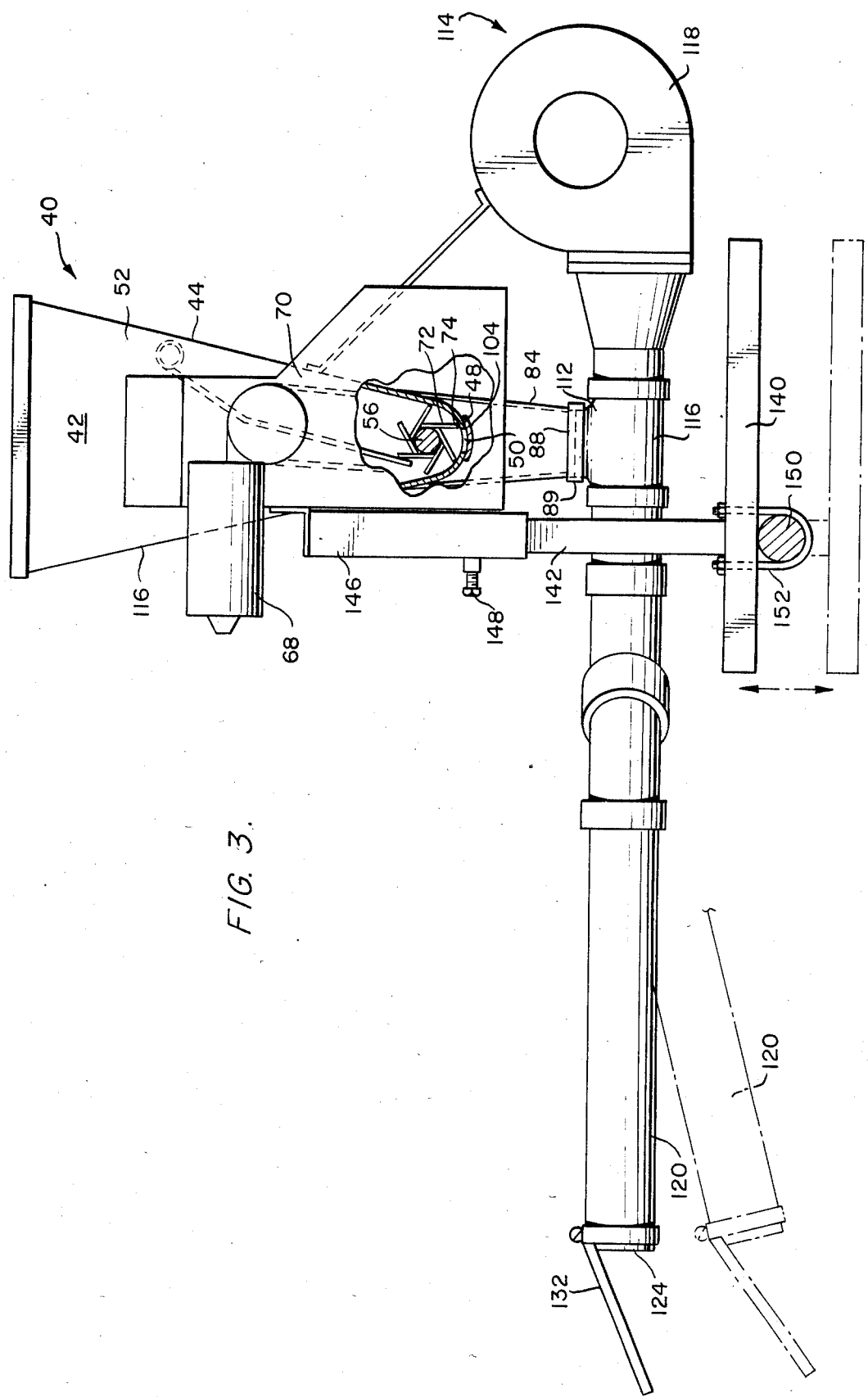
FIG. 3 is an enlarged side view of the chemical dispenser.

The chemical dispenser which is the subject of this invention is shown at 40 in FIG. 1 and more detailed in FIG. 2 and 3. FIG. 2 shows the dispenser 40 comprising a hopper 42 having a front wall 44, a rear wall 46 and a closable lid 47. The front and side walls taper inwardly and are brought together at their lower ends to form a round bottom 48. The round bottom 48 has at least three diamond shaped metering openings 50 which are of specific dimension to permit free flow of a specific quantity of particulate chemicals to flow through the openings when same are restricted or partially restricted. The significance of these features is very important and will be further explained below. The hopper 42 has side walls 52 and 54 which are secured to the front and rear wall to form a chamber 55 for the temporary storage of particulate chemicals.

Figure 4:
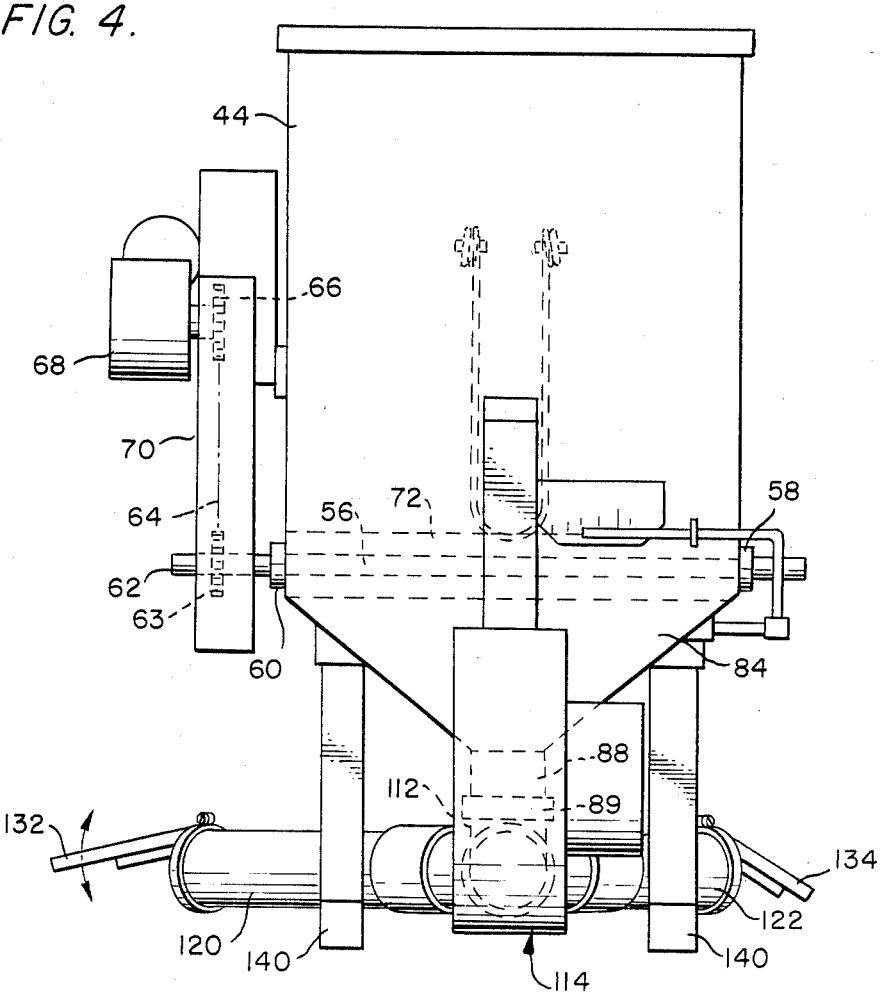
FIG. 4 is an enlarged end view of the chemical dispenser.
Figure 6:
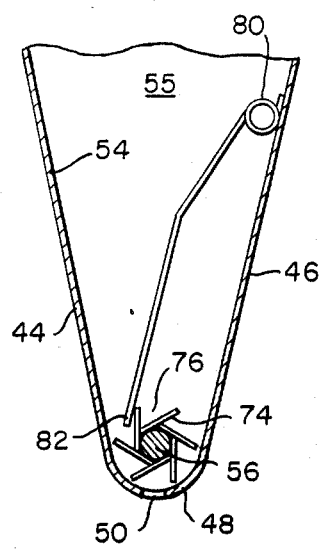
FIG. 6 is a cutaway side view of the hopper near the bottom thereof showing a rotatable shaft having blades and showing a vibrator spring acting with the blades.
Figure 10:
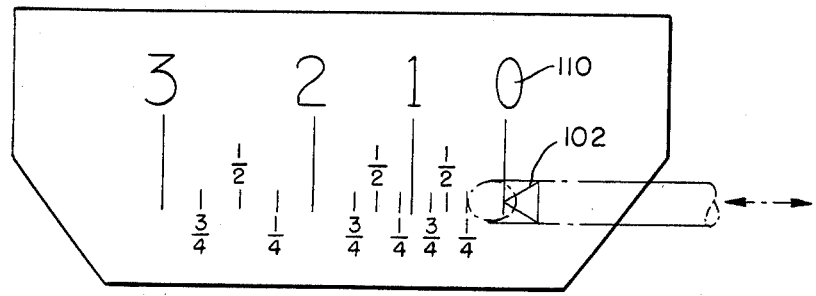
FIG. 10 is a perspective view of a pointer and indicia for showing the degree of openings in metering openings.
Figure 11:
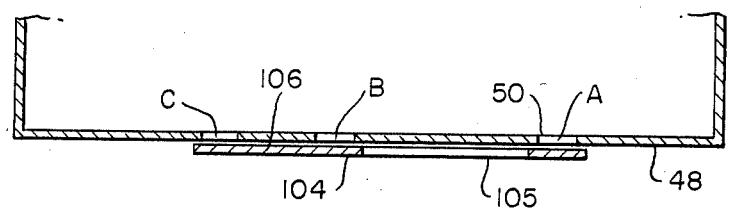
FIG. 11 is a side view of the bottom of the hopper showing the slide covering all metering openings.
Figure 12:
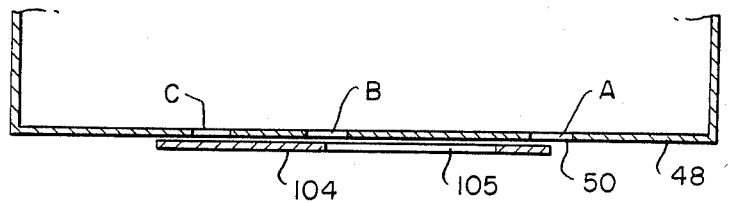
FIG. 12 is a side view as in FIG. 11 and shows the slide moved so that metering opening 1 and 2 are ½ open.
Figure 13:
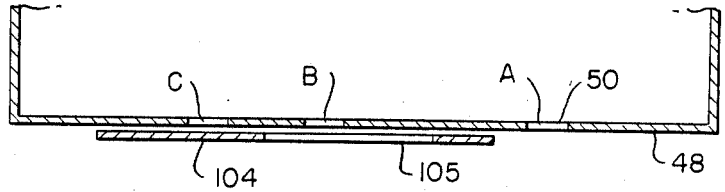
FIG. 13 shows metering openings 1 and 2 as being fully open.
Figure 14:
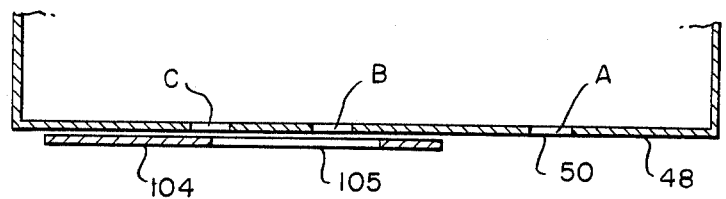
FIG. 14 shows metering openings 1 and 2 as being fully open and metering opening 3 as being ½ open.
Figure 15:
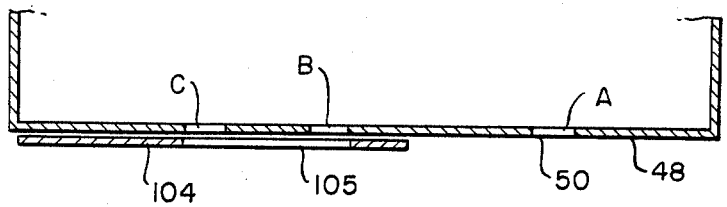
FIG. 15 shows all the metering openings as being fully open.

A cross-shaft 56, having bearings 58 and 60, is secured between the side walls near the rounded bottom 48, FIG. 4 and 6. The end 62 of the shaft 56 has a sprocket 63 over which is trained a drive chain 64. The other end of the drive chain 64 is trained about a sprocket 66 of motor 68, which motor is attached to the side wall of the hopper by any suitable means. The motor 68 may be electric and may derive its power source from the battery of the tractor by suitable electrical wires and an on/off switch. A guard 70 encloses the sprockets and the chain for safety.

Secured to the cross-shaft 56 are a plurality of blades 72 having outer edges 74. The blades 72 are non-radial and incline rearwardly in the direction of rotation of the shaft 56 and form triangular chambers 76 which serve to gather the chemicals within the hopper and move the chemicals into the bottom 48. It will be seen that the edges 74 of the blade 72 contact the inside walls 44 and 46 near the bottom 48 such that chemicals cannot pass from the upper chamber 55 of the hopper into the bottom 48 during non-rotation of the shaft 56. Secured to the inside of the rear wall 46 and central thereof is a coil spring 80 having an end 82 which extends over the edges 74 of the blade 72. As the blades rotate, the ends 82 of the spring 80 snap over the edges 74 and strike the face of the next blade thus jarring the assembly. This jarring action is necessary to keep the chemicals from clumping and clogging the area in the vicinity of the metering openings 50. It is important that the chemicals be kept in free flowing condition so as to pass freely through the metering openings 50.

Attached to the bottom 48 of the hopper 42 is an inverted cone 84 tapering to an opening 86 about which there is a depending nipple 88. The inverted cone 84 has an opening 90 within which there is a section of a pipe 92. This feature will be further explained below. FIGS. 7, 8 and 9.

The metering openings 50 are selectively opened and closed by a slide member 94 having a horizontal rod 96, a vertical rod 98 and a horizontal indicating member 100 having a pointed end 102. Attached to the rod 96 is a slide plate 104 having a concave surface 106 which abuts against the convex surface 108 of the bottom 48. The slide plate 104 has an opening 105 therein. The bar 96 is slidable in the pipe section 92 which also functions to maintain the bar perfectly horizontal. The slide plate 104 is constructed so that all of the metering openings 50 are closed when the bar 96 is retracted as far as it will go in the direction of arrow Y. In this position, the pointer 102 lies adjacent the closed marking indicia 110 imprinted on the front wall 44 of the hopper. The metering openings 50 are designated A, B and C and the sequence of opening them is as follows: FIGS. 7 and 10-15.

Push inwardly on the vertical rod 96 until the pointer 102 lies adjacent the ¼ opening mark. At this point, openings A and B are both ¼ open for an effective opening of ½. Movement of the pointer to the ½ indicia will result in A and B each being opened ½ for an effective opening of 1 full opening. Movement of the pointer to the ¾ position will result in A and B each being opened ¾ for an effective opening of 1½. Movement of the pointer to the 1 position results in A and B each being both fully open for an effective opening of 2. Movement of the pointer to the 1 and ¼ position will result in openings A and B being fully opened and opening C being ¼ open for an effective opening of 2 and ¼. Movement of the pointer to the 2 and ½ position will result in A and B being fully opened and C being ½ open for an effective opening of 2 and ½. Movement of the pointer to the 3 position will result in metering openings A and B and C being fully opened.

Figure 5:
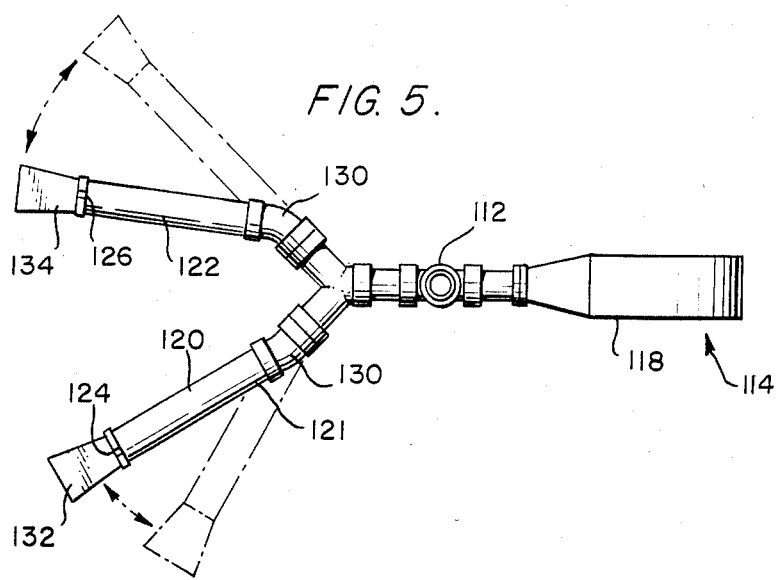
FIG. 5 is a plan view of the air stream generating means and the conveying means with branch lines, the branch lines being adjustable to vary the width of the chemicals spread across a swath of hay or crop before it is formed into a bale.

Referring to FIG. 3 and 5, the cone 94 is shown with a nipple 88. Attached to the nipple 88 by a clamp 89 is a manifold 112 of a blower 114. The manifold 112 opens into a feed conduit 116 having a fan blower 118 at one end and bifurcated feed line conduits 120 and 122 at the other end. The chemical material enters the manifold 112 through the opening 86 of the end 88 of the cone chamber 84 and gravitates into the line 116 where it is discharged through the line 116 and the branch lines 120 and 122 by the action of the fan blower 118. The chemical particulate material is discharged through the discharge openings 124 and 126 at the ends of the branch lines 120 and 122. Branch lines 120 and 122 are adjustable to vary the angle between the lines 120 and 122. This is accomplished by providing a elbow 130 in the line 120 whereby the outer portion 121 of the line may be rotated thus increasing or decreasing the angle between the lines 120 and 122. This feature is important so as to permit the dispenser to be adaptable to various balers having capacities to make bales of various widths. To assist in this feature, the ends 124 and 126 of the branch lines 120 and 122 have adjustable deflectors 132 and 134 for directing the chemical particulate materials onto the mat of hay as it is being fed into the baler chamber.

FIG. 3 shows the dispenser 40 having L-shaped legs including a horizontal leg 140 and a vertical members 142 which are telescoped into tubes 146 which are fastened to the wall 46 by welding or the like. Legs 142 are vertically adjustable in the tubes 146 and screws 148 are used to hold the vertical members 142 in place. The horizontal legs 140 are rested on a horizontal beam 150 extending between the sides of the baler near the open end. U-bolts 152 with nuts secure the legs 140 to the beam. Alternatively, the legs 140 may be eliminated and the ends 154 of the vertical members 142 being provided with half moon brackets 156 and 158 which secure the vertical members 146 to the beam 150 by bolts 160 and nuts.

The following chart lists the rate of flow of particulate chemical materials according to the size of the openings of A, B and C.

| OPENING | SILO GUARD II | | HAY GUARD | |
|---|---|---|---|---|
| | 5 Minutes | Average lb./min. | 5 minutes | Average lb./min. |
| 1/4 | 1 1/2 lb. | 4.8 ozs. | 1/2 lb. | 1.6 ozs. |
| 1/2 | 2 3/4 lb. | 8.8 ozs. | 1 1/4 lb. | 4 ozs. |
| 3/4 | 6 lbs. | 1.2 lbs. | 2 lb. | 6.4 ozs. |
| 1 | 10 1/2 lbs. | 2 lbs. | 5 lb. | 1 lb. |
| 1 1/4 | 16 lbs. | 3.2 lbs. | 11 lb. | 2.2 lbs. |
| 1 1/2 | 18 lbs. | 3.6 lbs. | 15 lbs. | 3 lbs. |
| 1 3/4 | 23 lbs. | 4.6 lbs. | 18 lbs. | 3.6 lbs. |
| 2 | 28 | 5.6 lbs. | 20 1/2 lbs. | 4 lbs. |
| 2 1/4 | 31 lbs. | 6.2 lbs. | 29 lbs. | 5.8 lbs. |
| 2 1/2 | 36 lbs. | 7.2 lbs. | 36 lbs. | 7.2 lbs. |
| 2 3/4 | 41 lbs. | 8.2 lbs. | 41 lbs. | 8.2 lbs. |
| 3 | 46 lbs. | 9.2 lbs. | 45. lbs. | 9 lbs. |

The right column shows the flow of a hygroscopic chemical consisting of organic salt, limestone and sodium bicarbonate sold under the trademark HAY GUARD. The left column shows the rate of flow of another less hygroscopic chemical material sold under the mark SILO GUARD II. It is crucial that the dispenser be capable of discharging various quantities of chemicals to accommodate for the degree of wetness of hay or crop to be baled. The greater the wetness of the hay or crop, the greater the amount of chemicals required to prevent internal combustion and other crop spoilage. To this end, an operator of the baler or a farmer will determine the wetness of the hay or crop to be baled and then determine the amount of chemicals to be discharged and consequently, adjust the slide member accordingly.

In the instant invention is also useful for dispensing chemicals into silage which is being conveyed into a silage storage container. To this end, the dispenser is attached to a suitable conveyor used for elevating silage into a silage container. The amount of chemicals dispensed into the silage is also determined by the openings in the metering openings A, B and C.

While the invention has been described and illustrated with respect to the preferred embodiment thereof, it will be understood to those skilled in the art that this description and illustration are offered only by way of example and that other modifications and embodiments are contemplated which would fall within the scope of the invention as described by the following claims.

What is claimed is:

1. A chemical dispenser for round hay balers having; a movable housing on wheels; a bale forming chamber within the housing adapted to turn a continuous mat of hay into a roll to form a round bale; a pick-up assembly having tines to lift scattered hay and move same onto a conveyor for movement into the bale forming chamber, the dispenser comprising:
   a hopper mounted on said housing for holding a quantity of particulate chemicals, said hopper having side walls connected to inwardly converging front and rear walls, said side walls and said inwardly converging front and rear walls joined together to form a rounded bottom having a plurality of openings therein;
   a rotatable shaft within the hopper near the rounded bottom wall having blades extending rearwardly toward the rear wall;
   control means beneath said rounded bottom for selectively opening two of said openings simultaneously by 1/4 increments until the two openings are fully opened and thereafter opening another of said openings by 1/4 increments thereby permitting selective predetermined quantities of particulate chemicals to pass therethrough;
   an inverted cone on the rounded bottom wall for receiving particulate chemicals after same is discharged through said openings, said inverted cone having an open end for discharging said particulate chemicals;
   a blower having a manifold for the reception of said particulate chemicals discharged through said open end of said inverted cone; and
   conduit means connected to said manifold of said blower for channeling said particulate chemicals pushed by the air from the blower toward the bale forming chamber for distribution in a layer over the mat of hay or crop before same is rolled into a round bale.

2. A chemical dispenser for round hay balers as defined in claim 1, wherein:
   said openings in said rounded bottom wall being diamond-shaped and being laterally spaced.

3. A chemical dispenser for round hay balers as defined in claim 2, wherein:
   said diamond-shaped openings being of specific dimension to permit passage of a given quantity of particulate chemicals.

4. A chemical dispenser for round hay balers as defined in claim 1, wherein:
   said rotatable shaft having said blades define a plurality of triangular chambers for moving said particulate chemicals in the direction of said openings.

5. A chemical dispenser for round hay balers as defined in claim 4, wherein:
   said blades having outer edges sweeping against the rounded bottom and forming a seal for preventing particulate chemicals from discharging through said openings during non-rotation of the shaft.

6. A chemical dispenser for round hay balers as defined in claim 1, wherein:
   said rotatable shaft and said blades being a vibrator for said particulate chemicals.

7. A chemical dispenser for round hay balers as defined in claim 1, wherein:
   said control means for selectively opening said openings being a slide having a concave surface adapted to abut the rounded bottom wall and having handle means for moving said slide in quarter increments.

8. A chemical dispenser for round hay balers as defined in claim 7, wherein:
   said quarter increments being determined by a pointer movable across quarter increment indicia.

9. A chemical dispenser for round hay balers as defined in claim 1, and:
   said control means having means for visually indicating the degree of openings of said openings.

10. A chemical dispenser for round hay balers as defined in claim 9, and:
    said indicator means being a pointer cooperating with indicia printed on said front wall for indicating the degree of openings of said openings.

11. A chemical dispenser for round hay balers as defined in claim 10, wherein:
    said control means is a slide with concave surface abutting the underside of said rounded bottom and being within said inverted cone.

12. A chemical dispenser for round hay balers as defined in claim 11, wherein:

said inverted cone having means for maintaining said slide having said concave surface abutting the underside of said rounded bottom and for stablizing said slide during reciprocation of said slide beneath said rounded bottom.

13. A chemical dispenser as for round hay balers as defined in claim 1, wherein:
said conduit means having diverging branch lines at least one of which is adjustable to vary the angle between said branch lines thus varying the width of distribution of particulate chemicals over a mat of hay or crop in the bale forming chamber.

14. A chemical dispenser for round hay balers as defined in claim 13, and:
deflectors at the ends of the branch lines for deflecting said particulate chemicals over said mat of hay or crop prior to said mat being fromed into a round bale in the bale forming chamber.

15. A chemical dispenser for round hay balers as defined in claim 1, and:
agitator means attached to the inside of said front wall and having spring biased legs extending over the blades of said rotor such that when said blades rotate said legs vibrate against said blades thus jarring said shaft causing vibration of said particulate chemicals to keep same in free flowing condition.

16. A chemical dispenser for round hay balers as defined in claim 1, and:
said rotatable shaft and said blower being operated from the power source of a tractor through electrical wires having appropriate switches for turning said blower on and off.

17. A chemical dispenser for hay balers having; a movable housing on wheels; a bale forming chamber within the housing adapted to form a bale of hay; a pick-up assembly having tines to lift scattered hay and move same into the bale forming chamber, the dispenser comprising:
a hopper mounted on said housing for holding a quantity of particulate chemicals, said hopper having side walls connected to inwardly converging front and rear walls, said side walls and side inwardly converging front and rear walls joined together to form a rounded bottom having a plurality of openings therein;
a rotatable shaft within the hopper near the rounded bottom wall having blades extending rearwardly toward the rear wall;
control means beneath said rounded bottom for selectively opening two of said openings simultaneously by ¼ increments until said two openings are fully opened and thereafter selectively opening another of said openings by ¼ increments until said other opening is fully open thus permitting predetermined quantities of particulate chemicals to pass therethrough; and
said control means having an indicator cooperating with indicia printed on said front wall for indicating the degree of opening of said openings.

* * * * *